(12) United States Patent
Pichara et al.

(10) Patent No.: US 11,631,034 B2
(45) Date of Patent: Apr. 18, 2023

(54) METHOD OF CLASSIFYING FLAVORS

(71) Applicant: NOTCO DELAWARE, LLC, Santiago (CL)

(72) Inventors: Karim Pichara, Santiago (CL); Pablo Zamora, Santiago (CL); Matias Muchnick, Santiago (CL); Antonia Larranaga, Santiago (CL)

(73) Assignee: NotCo Delaware, LLC, Santiago (CL)

( * ) Notice: Subject to any disclaimer, the term of this patent is extended or adjusted under 35 U.S.C. 154(b) by 270 days.

(21) Appl. No.: 17/221,129

(22) Filed: Apr. 2, 2021

(65) Prior Publication Data

US 2021/0219583 A1 Jul. 22, 2021

Related U.S. Application Data

(63) Continuation of application No. 16/983,406, filed on Aug. 3, 2020, now Pat. No. 10,993,465.

(60) Provisional application No. 62/884,438, filed on Aug. 8, 2019.

(51) Int. Cl.
   *G06N 20/00* (2019.01)
   *A23L 27/20* (2016.01)
   *G06F 18/2431* (2023.01)
   *G06V 10/764* (2022.01)

(52) U.S. Cl.
   CPC .............. *G06N 20/00* (2019.01); *A23L 27/20* (2016.08); *G06F 18/2431* (2023.01); *G06V 10/764* (2022.01); *A23V 2002/00* (2013.01)

(58) Field of Classification Search
   CPC ..... G06N 20/00; A23L 27/20; G06F 18/2431; G06F 18/232; G06V 10/764; A23V 2002/00
   See application file for complete search history.

(56) References Cited

U.S. PATENT DOCUMENTS

| | | | |
|---|---|---|---|
| 5,305,076 | A | 4/1994 | Inoue et al. |
| 8,044,354 | B2 | 10/2011 | Werner et al. |
| 8,419,433 | B2 | 4/2013 | Do et al. |
| 8,647,121 | B1 | 2/2014 | Witlin et al. |

(Continued)

FOREIGN PATENT DOCUMENTS

| | | |
|---|---|---|
| WO | 2004083451 A1 | 9/2004 |
| WO | 2013052824 A1 | 4/2013 |

(Continued)

OTHER PUBLICATIONS

International Searching Authority, "International Preliminary Report" in application No. PCT/US2020/044770, dated Feb. 17, 2022, 5 pages.

(Continued)

*Primary Examiner* — Robert G Bachner
(74) *Attorney, Agent, or Firm* — Haverstock & Owens, A Law Corporation

(57) ABSTRACT

Techniques to generate a flavor profile using artificial intelligence are disclosed. A flavor classifier classifies flavors for a given set of ingredients of a recipe from a set of possible classes of flavors. The flavor classifier may use different deep learning models to allow for different granularity levels corresponding to each flavor based on desired preciseness with classification of a particular flavor. A respective flavor predictor may or may not be used for each granularity level based on output of a certainty level classifier used for determining a preceding level of granularity.

20 Claims, 8 Drawing Sheets

(56) References Cited

U.S. PATENT DOCUMENTS

| | | |
|---|---|---|
| 8,775,341 B1 | 7/2014 | Commons |
| 9,513,167 B2 | 12/2016 | Hargreaves et al. |
| 9,519,620 B1 | 12/2016 | Pinel et al. |
| 9,841,897 B2 | 12/2017 | Palmer et al. |
| 10,325,181 B2 | 6/2019 | Xu |
| 10,515,715 B1 | 12/2019 | Pappas et al. |
| 10,915,818 B1 | 2/2021 | Patel et al. |
| 10,957,424 B1 | 3/2021 | Navon et al. |
| 10,962,473 B1 | 3/2021 | O'Hara et al. |
| 10,970,621 B1 | 4/2021 | Pichara et al. |
| 10,984,145 B1 | 4/2021 | Hutchinson et al. |
| 10,993,465 B2 | 5/2021 | Pichara et al. |
| 11,164,069 B1 | 11/2021 | Korsunsky et al. |
| 11,164,478 B2 | 11/2021 | Pichara et al. |
| 11,348,664 B1 | 5/2022 | Kaneko et al. |
| 11,373,107 B1 | 6/2022 | Clavero et al. |
| 11,404,144 B1 | 8/2022 | Kang et al. |
| 11,514,350 B1 | 11/2022 | Kaneko et al. |
| 2002/0184167 A1 | 12/2002 | McClanahan |
| 2003/0157725 A1 | 8/2003 | Franzen et al. |
| 2004/0153250 A1 | 8/2004 | Hurst et al. |
| 2005/0143936 A1 | 6/2005 | Laughlin et al. |
| 2007/0139667 A1 | 6/2007 | Russell et al. |
| 2009/0055247 A1 | 2/2009 | Jackson |
| 2011/0020518 A1 | 1/2011 | Delort et al. |
| 2012/0082362 A1 | 4/2012 | Diem et al. |
| 2012/0328178 A1 | 12/2012 | Remiszewski et al. |
| 2013/0149679 A1 | 6/2013 | Tokuda et al. |
| 2013/0221222 A1 | 8/2013 | Baiz et al. |
| 2013/0222406 A1 | 8/2013 | Wolfe et al. |
| 2016/0025569 A1 | 1/2016 | Hargreaves et al. |
| 2016/0110584 A1 | 4/2016 | Remiszewski et al. |
| 2016/0358043 A1 | 12/2016 | Mu |
| 2017/0116517 A1 | 4/2017 | Chee et al. |
| 2017/0139902 A1 | 5/2017 | Byron et al. |
| 2017/0220558 A1 | 8/2017 | Pinel et al. |
| 2017/0238590 A1 | 8/2017 | Bansal-Mutalik et al. |
| 2017/0345185 A1 | 11/2017 | Byron et al. |
| 2018/0101784 A1 | 4/2018 | Rolfe et al. |
| 2018/0192680 A1 | 7/2018 | Fraser et al. |
| 2018/0203921 A1 | 7/2018 | Privault et al. |
| 2018/0293489 A1 | 10/2018 | Eyster |
| 2018/0357299 A1 | 12/2018 | Miranda et al. |
| 2019/0171707 A1 | 6/2019 | Rapaport |
| 2019/0200797 A1 | 7/2019 | Diao et al. |
| 2019/0228855 A1 | 7/2019 | Leifer |
| 2019/0228856 A1 | 7/2019 | Leifer et al. |
| 2019/0295440 A1 | 9/2019 | Hadad |
| 2020/0268032 A1 | 8/2020 | Okuyama |
| 2020/0309746 A1 | 10/2020 | Sakai |
| 2020/0365053 A1 | 11/2020 | Pichara et al. |
| 2021/0027379 A1 | 1/2021 | Zhu et al. |
| 2021/0037863 A1 | 2/2021 | Pichara |
| 2021/0117665 A1 | 4/2021 | Simantov et al. |

FOREIGN PATENT DOCUMENTS

| | | |
|---|---|---|
| WO | 2016010097 A1 | 1/2016 |
| WO | 2017070605 A1 | 4/2017 |
| WO | 2020237214 A1 | 11/2020 |
| WO | 2021026083 A1 | 2/2021 |
| WO | WO 2012/026083 A1 | 2/2021 |
| WO | 2021071756 A1 | 4/2021 |
| WO | 2022010503 A1 | 1/2022 |
| WO | 2022010544 A1 | 1/2022 |
| WO | 2022035464 A1 | 2/2022 |
| WO | 2022098381 A1 | 5/2022 |
| WO | 2022/235326 A1 | 11/2022 |
| WO | 2022/240439 A1 | 11/2022 |

OTHER PUBLICATIONS

International Searching Authority, "Search Report" in application No. PCT/US20/44770, dated Dec. 4, 2020, 10 pages.

Claims in application No. PCT/US 20/44770, dated Dec. 2020, 6 pages.

Pichara, U.S. Appl. No. 16/983,406, filed Aug. 3, 2020, Office Action, dated Dec. 18, 2020.

Pichara, U.S. Appl. No. 16/983,406, filed Aug. 3, 2020, Notice of Allowance, dated Feb. 26, 2021.

Cromwell et al., "Computational Creativity in the Culinary Arts", Proceedings of the Twenty-Eighth International Florida Artificial Intelligence Research Society Conference, dated 2015, 5 pages.

Yuan et al., "An Inductive Content-Augmented Network Embedding Model for Edge Artificial Intelligence", IEEE Transaction on Industrial Informatics, vol. 15 No. 7, Jul. 2019, pp. 4295-4305.

Hodgkin, "The Castlemaine Project: Development of an AI-based Drug Design Support System", Molecular Modelling and Drug Design, 1994, pp. 137-169.

Peiretti et al., "Artificial Intelligence: The Future for Organic Chemistry?", ACS Omega, 2018, 3 (10), pp. 13263-13266.

Canada Patent Office, "Office Action", in application No. 3,140,835, dated Dec. 17, 2021, 4 pages.

Chinese Patent Office, "Office Action", in application No. 202080049557.8, dated Nov. 18, 2022, 10 pages.

Park et al., "FlavorGraph: a large-scale food-chemical grpah for generating food representations and recommending food pairings", Scientific Reports: nature Research, vol. 11, Jan. 13, 2021, 13 pages.

Paul, Rahl, "Classifying Cooking Object's State using a Tuned VGG Convolutional Neural Netwrok," May 2018, 5 pages.

Fromm et al., "A Vector Space model for Neural Network Functions: Inspirations from Similarities between the Theory of Connectivity and the Logarithmic Time Course of Word Production", Frontiers in Systems Neuroscience, Aug. 28, 2020, 10 pages.

Hahladakis et al., "An Overview of Chemical Additives Present in Plastics: Migration, Release, Fate and Environmental Impact During Their Use, Disposal and Recycling", Journal of Hazardous Materials 344 (2018), pp. 179-199.

Chinese Patent Office, "Office Action", in application No. 202080049557.8, dated Jun. 6, 2022, 9 pages.

Zou et al., "Regularization and Variable Selection via the Elastic Net", Department of Statistics, Stanford University, dated Dec. 5, 2003, 29 pages.

Bowman et al., "Generating Sentences from a Continuous Space", May 2016.

Rudinger et al., Skip-Prop: Representing Sentences with One Vector Pre Proposition, 12th International Conference or Computational Semantics, dated 2017, 7 pages.

Karamanolakis et al., "Item Recommendation with Variational Autoencoders and Heterogeneous Priors", DLRS, dated Oct. 2018, 5 pages.

Eating bird food, "Vegan "Chicken" Salad", https://www.eatingbirdfood.com/simple-vegan-mock-chicken-salad/, Apr. 5, 2017, downloaded Mar. 11, 2021. (Year: 2017).

Rong, Xin. word2vec Parameter Learning Explained. arXiv:1411.2738v4 [cs.CL] Jun. 5, 2016. (Year: 2016).

Salvador, Amaia, et al. "Learning cross-modal embeddings for cooking recipes and food images." Proceedings of the IEEE conference on computer vision and pattern recognition. 2017. (Year: 2017).

David Xu, "Machine Learning for Flavor Development," Bachelor's Thesis, Harvard College, School of Engineering and Applied Sciences, Apr. 5, 2019, 69 pages.

Hattab et al., Application of an Inverse Neural Network Model for the Identification of Optimal Amendment to Reduce Copper Toxicity in Phytoremediated Contaminated Soils, Journal of Geochemical Exploration, Elsevier, 2014, 136, pp. 14-23, 2014. (Year: 2014).

Kieaibi E., Determination of Protein Secondary Structure from Infrared Spectra Using Partial Least-Squares Regression, 9 pages, 2016 (Year: 2016).

Yang et al., "Obtaining information about protein secondary structures in aqueous solution using Fourier transform IR spectroscopy", Published online Feb. 5, 2015, nature protocols, 16 pages.

XGBoost, "Python Package Introduction", https://xgboost.readthedocs.io/en/latest/python/python_intro.html, last viewed on Nov. 5, 2020, 5 pages.

(56) References Cited

OTHER PUBLICATIONS

GitHub.com, "CMBI/DSSP", https://github.com/cmbi/dssp, last viewed on Nov. 5, 2020. 4 pages.
Wilcox et al., "Determination of Protein Secondary Structure from Infrared Spectra Using Partial Least-Squares Regression", dated 2016 American Chemical Society, 9 pages.
Sigma-Aldrich, "IR Spectrum Table and Chart", https://www.sigmaaldrich.com/technical-documents/articles/biology/ir-spectrum-table.html, last viewed on Nov. 5, 2020, 6 pages.
SciPy.org, "scipy.signal.savgol_filter", https://docs.scipy.org/doc/scipy/reference/generated/scipy.signal.savgol_filter.html, last viewed on Nov. 5, 2020, 3 pages.
SciPy.org, "scipy.integrate.simps", https://docs.scipy.org/doc/scipy/reference/generated/scipy.integrate.simps.html, last viewed on Nov. 5, 2020, 2 pages.
Scikitlearn.org, "sklearn.neighbors.KNeighborsRegressor", https://scikit-learn.org/stable/modules/generated/sklearn.neighbors.KNeighborsRegressor.html, last viewed on Nov. 5, 2020, 5 pages.
Scikitlearn.org, "sklearn.model_selection.GridSearchCV", https://scikit-learn.org/stable/modules/generated/sklearn.model_selection.GridSearchCV.html, last viewed on Nov. 5, 2020, 7 pages.
Scikitlearn.org, "sklearn.linear_model.lasso", https://scikit-learn.org/stable/modules/generated/sklearn.linear_model.Lasso.html, last viewed on Nov. 5, 2020, 6 pages.
Scikitlearn.org, "sklearn.cross_decomposition.PLSRegression", https://scikit-learn.org/stable/modules/generated/sklearn.cross_decomposition.PLSRegression.html, last viewed on Nov. 5, 2020, 5 pages.
Scikitlearn.org, "3.2.4.1.3. sklearn.linear_model.LassoCV", https://scikit-learn.org/stable/modules/generated/sklearn.linear_model.LassoCV.html, last viewed on Nov. 5, 2020, 6 pages.
ProDry, "DSSP Tools", http://prody.csb.pitt.edu/manual/reference/proteins/dssp.html, last viewed on Nov. 5, 2020, 2 pages.
Cao et al.,"Optimization of Formulations Using Robotic Experiments Driven by Machine Learning DoE", Cell Reports Physical Science, Jan. 20, 2021, 17 pages.
International Searching Authority, "Search Report" in application No. PCT/US2020/044770, dated Dec. 4, 2020, 9 pages.
United States Patent Office, "Office Action", in U.S. Appl. No. 16/983,406, dated Aug. 3, 2020, 9 pages.
United States Patent Office, "Notice of Allowance", in U.S. Appl. No. 16/983,406, dated Mar. 23, 2021, 4 pages.

METHOD OF CLASSIFYING FLAVORS

BENEFIT CLAIM

This application claims the benefit under 35 U.S.C. § 120 as a continuation of U.S. non-provisional application Ser. No. 16/983,406, filed Aug. 3, 2020, which claims the benefit under 35 U.S.C. § 119(e) of provisional application 62/884,438, filed Aug. 8, 2019, entire contents of all applications are hereby incorporated herein by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

One technical feature of the present disclosure is artificial intelligence and machine learning, as applied to food. Another technical field is food science. The disclosure relates, in particular, to use of machine learning to generate a flavor profile of a given formula for a recipe.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, many negative consequences of use of animals in the food industry are known, such as deforestation, pollution, human health conditions, and allergies, among others. In contrast, a plant-based diet is associated with improved health and well-being and reduces risk of diseases. Not only is a plant-based diet only good for our health but it is also good for the Earth's health. Research has shown that production of plant-based food items generates less greenhouse emissions and require less energy, water, and land than production of animal-based food items. There are plant alternatives to animal-based food items. For example, plant alternatives to meat include veggie burgers and other vegan meat food items. However, these alternatives do not match the flavor of meat.

Accordingly, there is a need for techniques to determine flavor profiles of food items for use, as such, when developing alternatives to the food items. Unfortunately, many techniques for determine flavor profiles of food items rely upon time-consuming, inaccurate, manual laboratory work in which food items are tasted. These approaches are inefficient, involve extensive time to develop a single successful food formula, and waste physical resources.

SUMMARY

The appended claims may serve as a summary of the invention.

DETAILED DESCRIPTION

Figure 1:
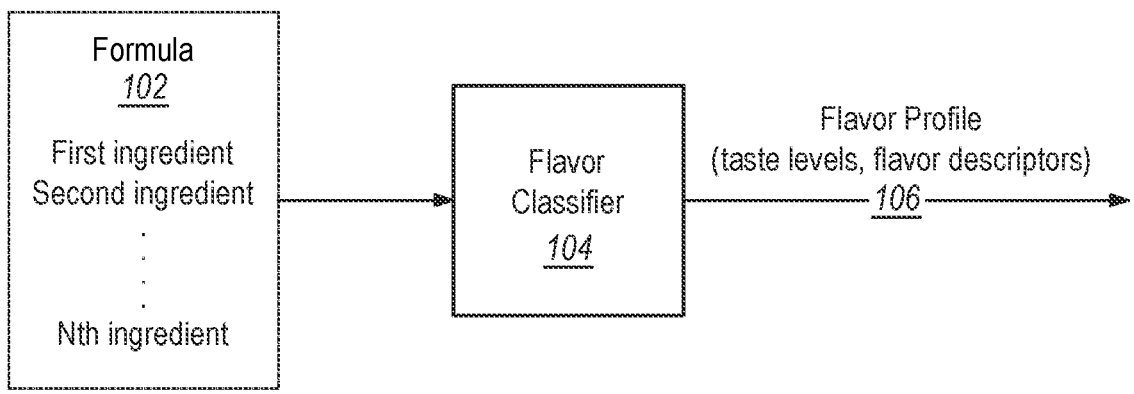
FIG. 1 illustrates an example system to generate a flavor profile of a formula for a recipe, in certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
2.0 STRUCTURAL OVERVIEW
3.0 FUNCTIONAL OVERVIEW
  3.1 CERTAINTY LEVEL CLASSIFIER
  3.2 FLAVOR CLASSIFIER
4.0 PROCEDURAL OVERVIEW
5.0 HARDWARE OVERVIEW
6.0 SOFTWARE OVERVIEW
7.0 OTHER ASPECTS OF DISCLOSURE

1. General Overview

Techniques described herein classify flavors for a given set of ingredients of a recipe from a set of possible classes of flavors, by using deep learning models to allow different granularity levels corresponding to each flavor based on the desired precision within a classification of a particular flavor. The granularity levels may be differentiated based on specificity, generality, and/or other criteria related to the flavors. A respective flavor predictor may or may not be used for each granularity level based on output of a preceding certainty level classifier used for determining a preceding level of granularity. In certain embodiments, deeper levels of granularity may be used only if a certain threshold is met for the preceding levels of granularity. Thresholds can be determined using binary, non-binary, entropy, or other suitable types of classifiers.

In one aspect, a computer-implemented method to perform a flavor classification of a formula for a recipe, comprises building a first digital model configured to accept a particular plurality of ingredients of a particular formula to produce a first plurality of certainty levels corresponding a set of flavor categories, and building a second digital model configured to accept a second plurality of certainty levels associated with a particular subset of flavor categories and to identify particular flavor classes, from a set of flavor classes, corresponding to the particular subset of flavor categories. The method comprises applying the first digital model to a specific plurality of ingredients of a specific formula and, in response to applying the first digital model, producing a specific plurality of certainty levels that includes a specific certainty level of each flavor category in the set of flavor categories. The method further comprises applying the second digital model to at least a first subset of the specific plurality of certainty levels and, in response to applying the second digital model, identifying a specific plurality of flavor classes for the specific formula. The method further comprises generating a flavor profile for the specific formula based on the specific plurality of flavor classes.

Other embodiments, aspects, and features will become apparent from the reminder of the disclosure as a whole.

2. Structural Overview

FIG. 1 shows an example system 100 to generate a flavor profile of a formula for a recipe, in certain embodiments. FIG. 1 is shown in simplified, schematic format for purposes of illustrating a clear example and other embodiments may include more, fewer, or different elements. FIG. 1, and the other drawing figures and all of the description and claims in this disclosure, are intended to present, disclose and claim a technical system and technical methods comprising specially programmed computers, using a special-purpose distributed computer system design and instructions that are programmed to execute the functions that are described. These elements execute functions that have not been available before to provide a practical application of computing technology to the problem of determining flavor profiles of food items. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

The system 100 includes a server computer 104. The server computer 104 utilizes a set of one or more computer programs or sequences of program instructions to perform flavor classification to generate a flavor profile 106 of a formula 102 for a recipe based on its ingredients. The flavor profile 106 can include one or more taste levels and/or one or more flavor descriptor. Programs or sequences of instructions organized to implement the flavor profile generating functions in this manner may be referred to herein as a flavor classifier. In an embodiment, the server computer 104 broadly represents one or more computers, such as one or more desktop computers, server computers, a server farm, a cloud computing platform, or a parallel computer, virtual computing instances in public or private datacenters, and/or instances of a server-based application.

The recipe for the formula 102 may belong to a set of recipes stored in a data repository (not illustrated) accessible by the flavor classifier 104. In certain embodiments, each recipe in the set of recipes may be stored with respective features such as flavor, texture, aftertaste, taste levels and an acceptability level.

The set of recipes may include recipes that have been generated using machine learning algorithms. An example recipe generator is described in co-pending U.S. patent application Ser. No. 16/416,095, filed May 17, 2019, titled "Systems and Methods to Mimic Target Good Items using Artificial Intelligence," wherein the entire contents of which are hereby incorporated by reference as if fully set forth herein.

Additionally or alternatively, the set of recipes may include recipes that have been generated by humans (e.g., cooked and modified by chefs; etc.), recipes obtained from an online resource (e.g., website; database; etc.) or offline resource, and/or obtained from any suitable source.

The recipes may have been cooked and tried by humans (e.g., chefs, company employees). In some examples, the recipes may have been cooked by robots. However, the recipes may be cooked and tried by any suitable entities. The feedback (e.g., obtained from human, non-human, and/or any suitable source; etc.) on each recipe (e.g., flavor, texture, aftertaste, etc.) may be used by the chefs, computing systems, and/or other suitable entities to modify the recipe.

The formula 102 may comprise a first ingredient, a second ingredient, . . . , and an Nth ingredient. The flavor profile 106 may include one or more taste levels and/or one or more flavor descriptors. For example, the taste level may indicate a level from a range of levels (e.g., one to five; any suitable numerical, verbal, graphical, and/or other suitable format for indicating a level and/or other suitable rating; etc.) for each taste descriptor (e.g., sweetness, saltiness, umami, sourness and bitterness). For example, the flavor descriptors may describe different flavors, e.g., floral, citric, milky, pungent, etc. However, any suitable taste descriptors and/or flavor descriptors (e.g., where the descriptors can be in numerical, verbal, graphical, and/or any other suitable format; etc.) can be used in describing a taste characteristic and/or a flavor characteristic.

In an embodiment, the ingredients 1-N may be represented as vectors of multiple features. In an embodiment, the formula 102 may be represented as a vector comprising a feature dimension for each ingredient in the formula 102. The formula vector 102 may include a first component corresponding to nutritional, chemical, and physiochemical attributes of all the ingredients in the formula, and a second component representing the name of each ingredient present in the formula.

Figure 2:
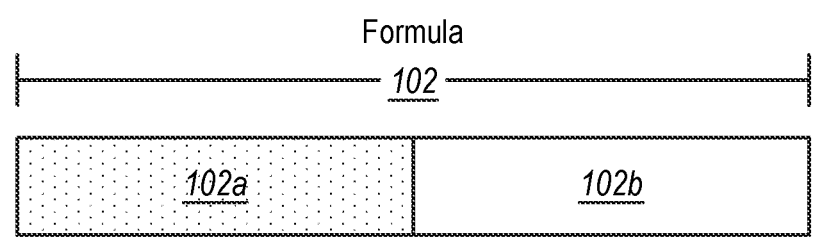
FIG. 2 illustrates an example representation of the formula in certain embodiments.

For example, as shown in FIG. 2, the formula 102 may include a first component 102a corresponding to nutritional, chemical, and physiochemical attributes of all the ingredients in the formula 102. The formula 102 may include a second component 102b to represent the formula according to the ingredients that are present in the formula 102. The first component 102a and the second component 102b may be used to represent each ingredient in a common feature space, e.g., using embedding. For example, a "Word2Vec" embedding may be used to represent a given ingredient. In some implementations, the embedding may be performed using a common representation so that each ingredient is uniformly represented across different standards. However, any suitable embedding and/or representation (e.g., vector, non-vector; etc.) of a formula including any suitable attributes describing ingredients can be used as inputs into any suitable models described herein.

The flavor classifier 104 is configured to perform flavor classification of a formula for a given recipe. The flavor classifier 104 may include a certainty level classifier configured to determine a certainty level of a flavor of the formula belonging to a flavor category. The flavor classifier 104 may include a threshold detector configured to determine whether the certainty level passes a threshold associated with the flavor category. The flavor classifier 104 may determine that a deeper level of flavor classification is needed based on the certainty level passing the threshold. The flavor classifier 104 may include a flavor predictor configured to perform the deeper level of flavor classification to identify a flavor from a set of flavors that best describes the formula. The components of the flavor classifier 104 may be implemented using software, hardware, firmware, or a combination thereof. In an embodiment, each of the certainty level classifier, the threshold detector, and the flavor predictor comprises one or more sequences of computer program instructions that are programmed to execute the functions that are described herein for the foregoing components. In an embodiment, one or more components of the flavor classifier 104 may include a processor configured to execute instructions stored in a non-transitory computer readable medium.

In some embodiments, different classes of flavors can be described for different granularity levels using a flavor wheel. An example flavor wheel is discussed with reference to FIG. 3.

Figure 3:
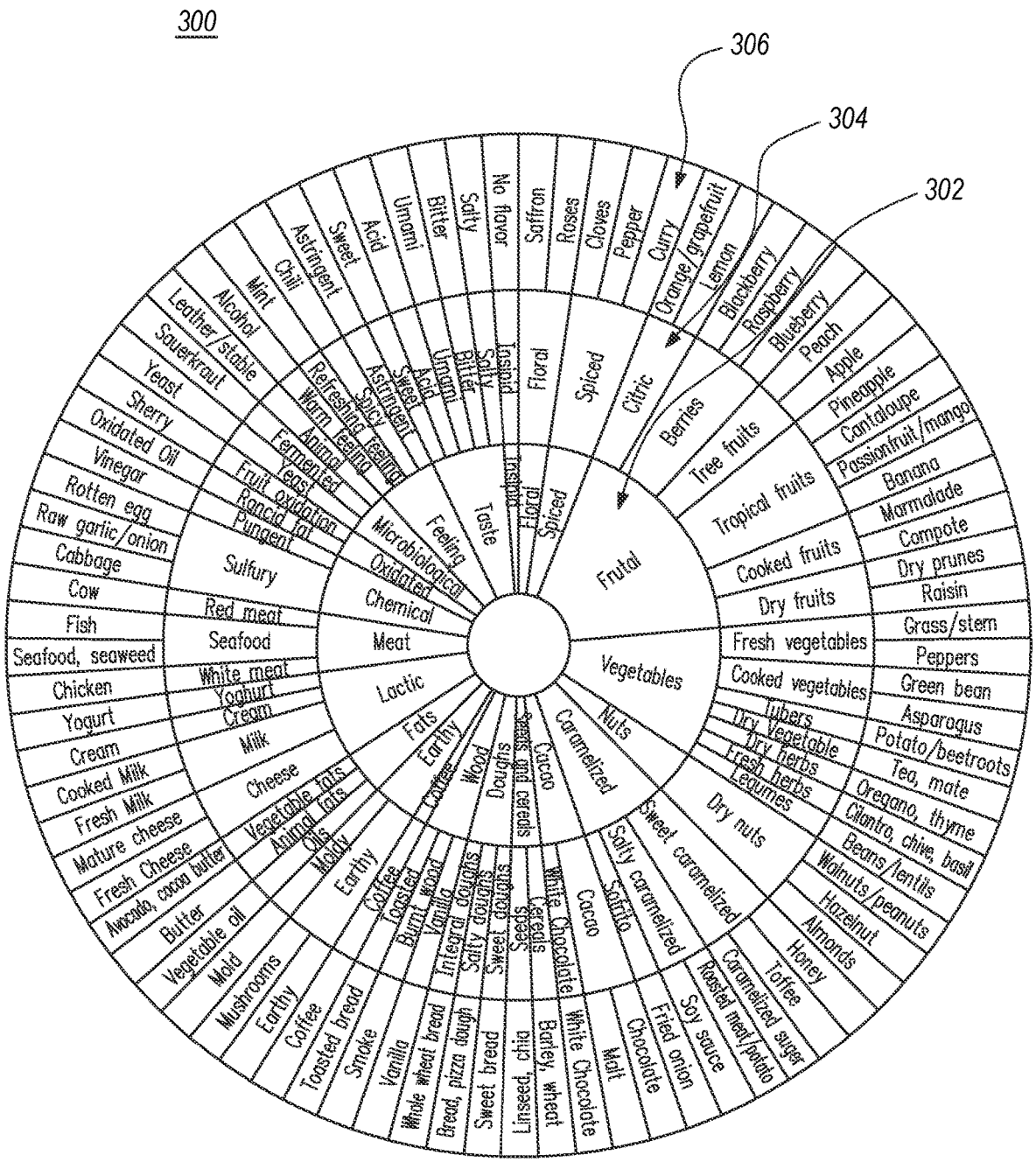
FIG. 3 illustrates an example flavor wheel in certain embodiments.

FIG. 3 illustrates an example flavor wheel 300 in certain embodiments. The flavor wheel 300 may be an adaptation of a known flavor wheel, or it may be a custom flavor wheel. The flavor wheel 300 may be used to represent various flavor classes at different granularity levels. An inner most flavor wheel may correspond to a set of flavor categories 302. A second or middle level of the flavor wheel 300 may correspond to a set of flavor descriptors 304.

Some non-limiting examples for the set of flavor categories 302 may include fats, spiced, vegetable, floral, meats, earthy, wood, chemical, feeling, doughs, taste, oxidated, nuts, etc. Each flavor category in the set of flavor categories 302 may include one or more corresponding flavor descriptors from the set of flavor descriptors 304. For example, the vegetable flavor category 302 may include fresh vegetable, cooked vegetable, tubers, dry vegetable, dry herbs, fresh herbs, or legumes, as the flavor descriptor 304.

For each flavor descriptor 304, the flavor wheel 300 shows example ingredients 306. For example, the fresh vegetable flavor descriptor 304 may include grass/stem and peppers.

The flavor wheel 300 may be used by the flavor classifier 104 to classify different flavors of a formula based on its ingredients to a flavor class from a set of flavor classes. For example, a classification model may be used to determine a level of certainty that a flavor of a formula belongs in a particular flavor category in the set of flavor categories 302.

In an embodiment, data associated with the flavor wheel 300 may be organized in a data structure, such as a table, matrix, a list, or the like, and may be stored in a data repository (not illustrated) accessible by the flavor classifier 104.

3.0 Functional Overview

In an embodiment, the certainty level classifier, the threshold detector, and the flavor predictor of the flavor classifier 104 interoperate programmatically in an unconventional manner to perform flavor classification of a formula for a given recipe (given set of ingredients).

3.1 Certainty Level Classifier

Figure 4:
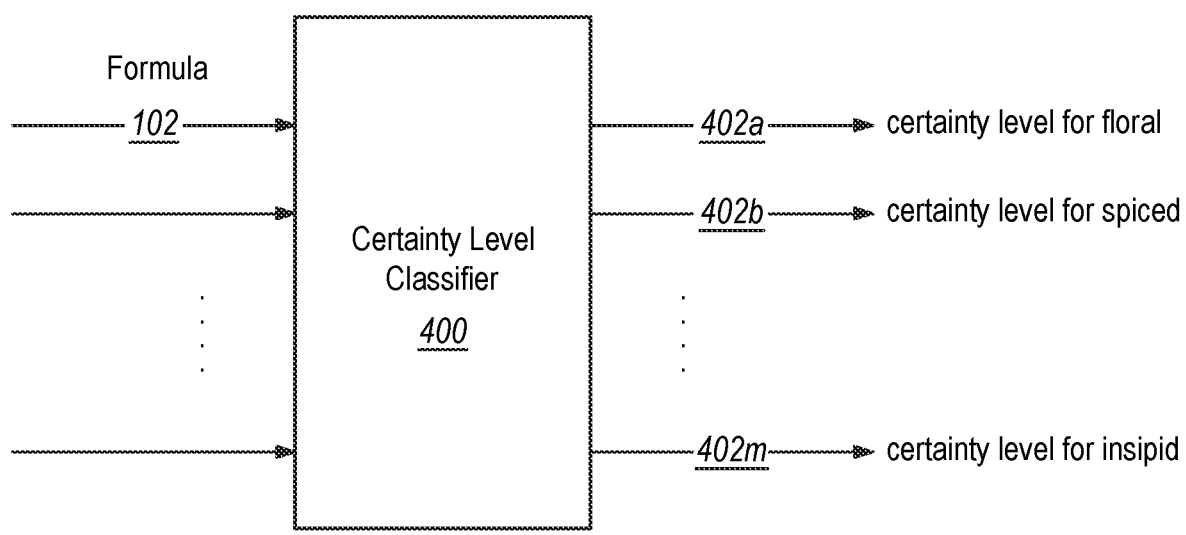
FIG. 4 illustrates an example certainty level classifier in certain embodiments.

FIG. 4 illustrates an example certainty level classifier 400 in accordance with certain embodiments.

The certainty level classifier 400 may be used for different formulas, including the formula 102. The certainty level classifier 400 may be configured to generate, for each flavor category 302 in the flavor wheel 300 in FIG. 3, a certainty level to indicate a level of certainty that a flavor of the formula 102 belongs in that flavor category 302.

For example, for the formula 102, the certainty level classifier 400 may generate a first certainty level 402a, a second certainty level 402b, . . . , and an Mth certainty level 402m. As an example, the first certainty level 402a may represent a certainty level for floral, the second certainty level 402b may represent a certainty level for spiced, and the Mth certainty level 402m may represent a certainty level for insipid. The certainty level may be represented using a percentage, a ratio, a rate, or another suitable representation.

In an embodiment, the certainty level classifier 400 may utilize a multi-label classification model, which may be trained to predict a respective level of certainty for each flavor category 302 in the flavor wheel 300. For example, the multi-label classification model may be based on neural networks, decision trees, k-nearest neighbors, and/or any other suitable algorithm. The certainty level classifier 400 may be built by training on dataset that includes sets of ingredients and corresponding labels that specify one or more flavor granularities (e.g., flavor category, flavor class).

The number of outputs generated by the certainty level classifier 400 may equate to the number of categories on the inner most level of the flavor wheel 300. As an example, the certainty level classifier 400 may generate twenty one outputs corresponding to twenty one flavor categories 302 in the flavor wheel 300. As shown in FIG. 3, an example twenty one flavor categories may include frutal, vegetable, nuts, caramelized, cacao, seeds and cereals, doughs, wood, coffee, earthy, fats, lactic, meats, chemical, oxidated, microbiological, feeling, taste, insipid, floral, and spiced. However, any suitable combination of flavor categories can be used, and any suitable verbal, numerical, graphical, and/or other suitable format can be used for the flavor categories.

The outputs generated by the certainty level classifier 400 may be used to determine if a next level of granularity may be needed for classification of a flavor in each flavor category as discussed with reference to FIG. 5. For example, if the certainty level indicates an acceptable level (e.g., at least 45%; 55%; 65%; 75%; 85%; any suitable acceptable level; etc.) in a particular flavor category, that flavor prediction can be reported and/or another classifier model (e.g., one or more classifier models for outputting flavor descriptors, such as flavor descriptors described by a flavor wheel; etc.) may be used to further narrow down the flavor class.

3.2 Flavor Classifier

Figure 5:
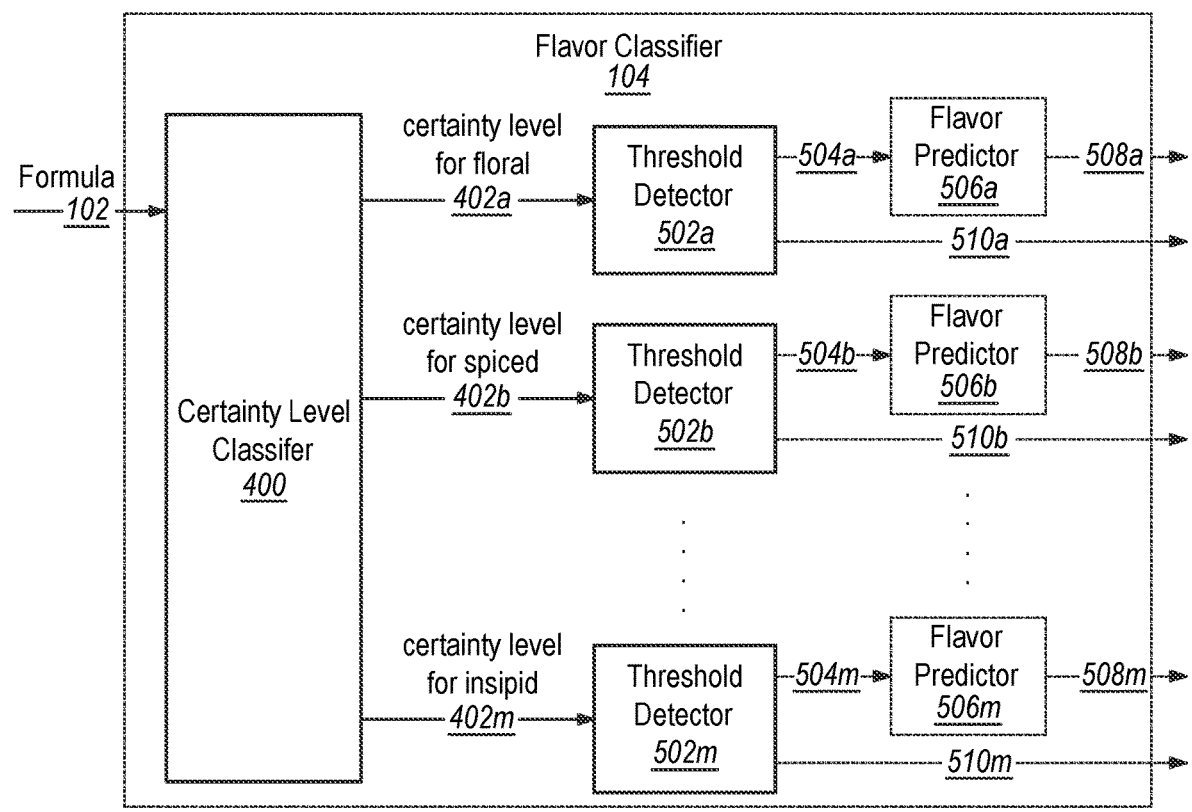
FIG. 5 illustrates an example block diagram of a flavor classifier in certain embodiments.

FIG. 5 illustrates an example block diagram of the flavor classifier 104 in certain embodiments.

The flavor classifier 104 may utilize respective threshold detectors 502a-502m for each flavor category 302 in the flavor wheel 300 in FIG. 3 to determine whether the flavor prediction can be performed at the next granularity level. As shown in FIG. 5, a respective threshold detector may be used to determine if an incoming certainty level generated by the certainty level classifier 400 passes a certain threshold.

For example, a threshold detector 502a may be used to compare the first certainty level 402a with a first threshold, a threshold detector 502b may be used to compare the second certainty level 402b with a second threshold, and a threshold detector 502m may be used to compare the Mth certainty level 402m with an Mth threshold. Different thresholds used by the threshold detectors 502a-502m may or may not be the same. The threshold detectors 502a-502m may be based on binary classifiers, maximum entropy classifiers, or another suitable implementation.

A respective flavor prediction at a deeper level of granularity can be performed if the certainty level for that flavor meets the respective threshold. For example, based on the outcome of the respective threshold detector 502a-502m, an optional flavor predictor 506a may be used to perform flavor prediction for floral flavor, an optional flavor predictor 506b may be used to perform flavor prediction for spiced flavor, and an optional flavor predictor 506m may be used to perform flavor prediction for insipid flavor. Each flavor predictor 506a-506m can be configured to generate a respective flavor profile by classifying the flavor of the formula 102 to a flavor class from a set of flavor classes. In an embodiment, the set of flavor classes may correspond to the set of flavor descriptors 304 in the flavor wheel 300.

As an example, if the first certainty level 402a for the floral flavor category 302 is higher than the first threshold, then the flavor predictor 506a may be used to identify a flavor descriptor from the flavor wheel 300 that can best describe the flavor of the formula. For example, the flavor predictor 506a may identify the flavor descriptor 304 as floral.

If the first certainty level 402a for the floral flavor category 302 is less than or equal to the first threshold, the formula 102 may be sent to computing device(s) associated with chef(s) and/or to other suitable entities (e.g., robots, labs, etc.) for tagging (e.g., tagging the formula 102 with flavor category labels, flavor descriptor labels, any suitable descriptors from a flavor wheel and/or other source, etc.). For example, a manual tag request 510a may be generated if the first certainty level 402a for floral is less than or equal to the first threshold, a manual tag request 510b may be generated if the second certainty level 402b for spiced is less than or equal to the second threshold, and a manual tag request 510m may be generated if the Mth certainty level 402m for insipid is less than or equal to the Mth threshold. Manual tag requests may be generated and/or transmitted for each certainty level determined to be less than and/or equal to a corresponding threshold. Additionally or alternatively, any suitable number and/or type of tag requests may be generated and/or transmitted to computing device(s) for any suitable outcomes of comparisons between certainty levels and thresholds (e.g., generating a manual tag request in response to a plurality of certainly levels falling below corresponding thresholds; generating a manual tag request in response to an aggregate certainty level falling below a corresponding threshold for the aggregate certainty level; etc.). The tagging may be performed to build or improve the training set since not meeting the threshold may be an indication that certain flavor classes may not have enough use cases.

In certain embodiments, a label may be associated with each flavor class which can be used for building or balancing a training dataset. For example, the respective flavor predictor 506a-506m for each of the particular flavor category may utilize certain classifiers that can be trained to generate a respective description of that flavor. A classifier may be trained for a particular flavor or a particular category of flavors. The classifiers may be based on supervised learning, unsupervised learning, and/or any other suitable machine learning algorithm. In an embodiment, the flavor predictors 506a-506m are built and trained using the same training set used to train the certainty level classifier 400. The labels may also be used by the chefs to differentiate various recipes for different flavor classes.

In an embodiment, number of classes that can be predicted by each classifier may depend upon the number of flavor descriptors 304 in each flavor category 302. For example, referring back to FIG. 3, for the flavor category "frutal", there can be six classes (e.g., citric, berries, tree fruits, tropical fruits, cooked fruits, and dry fruits) to predict, and for the flavor category "meats", there can be three classes (e.g., red meat, white meat, and seafood) to predict.

Referring again to FIG. 5, the flavor predictors 506a-506m and/or other suitable models (e.g., taste predictors; etc.) may additionally or alternatively be trained for each of the "taste" descriptors, e.g., salty, bitter, umami, acid, and sweet. However any suitable types of taste descriptors can be used (e.g., verbal, any suitable language, numerical, graphical, etc.). The flavor predictors 506a-506m and/or other suitable models may be configured to provide a respective output corresponding to a level of that particular taste. The taste levels can correspond to a range, e.g. from 1 to 5, but any suitable ranges and/or levels can be used. As an example, the possible taste levels can be very low (1), low (2), medium (3), high (4), and very high (5). However, determining taste levels can be performed in any suitable manner.

Thus, the flavor classifier 104 may provide a flavor profile including (e.g., for, etc.) different flavors in the formula 102 for the given recipe. For example, the flavor predictor 506a can provide a flavor class or descriptor 508a for the floral flavor, the flavor predictor 506b can provide a flavor class or descriptor 508b for the spiced flavor, and the flavor predictor 506m can provide a flavor class or descriptor 508m for the insipid flavor. Thus, the embodiments can classify various flavors for a set of ingredients in a formula at different granularity levels using deep learning models.

In an embodiment, a set of taste level classifiers (and/or other suitable taste models; etc.) may be used for determining taste level (e.g., from 1 to 5) for a set of taste descriptors (e.g., salty, bitter, umami, acid, and sweet, etc.); a multi-label flavor classifier model can be used in determining flavor categories; and a set of flavor predictor classifier models can be used for determining flavor descriptors; where any suitable combination of outputs from any suitable combination of models can be used in generating a flavor profile describing any suitable combination of ingredients (e.g., a recipe, etc.). In an embodiment, a single model can be used in determining any suitable type of flavor profile including any one or more of taste levels, flavor categories, flavor descriptors, and/or other suitable characteristics. In an embodiment, any suitable number, type, and combination of models can be used in determining any suitable type of flavor profile.

In an embodiment, numerical levels (e.g., from a range from 1 to 5, indicating a degree of that flavor) can be determined (e.g., using flavor predictors 506a-506m and/or other suitable models, etc.) for any suitable flavor category and/or flavor descriptor (e.g., at any suitable granularity level, such as at any suitable granularity level of a flavor wheel, etc.). In examples, a level (e.g., from a range from 1 to 5, indicating a degree of that flavor; selected from any suitable numerical range; a score; etc.) can be determined for each of a set of flavor categories and for each of a set of flavor descriptors. As such, a flavor profile can be determined to include flavors (e.g., flavor category, flavor descriptor, suitable flavors described in a flavor wheel and/or any other suitable source, etc.) at different levels (e.g., where the levels can be represented numerically, verbally, graphically, other suitable formats, etc.). However, flavors can be represented in any suitable manner.

4.0 Procedural Overview

Figure 6:
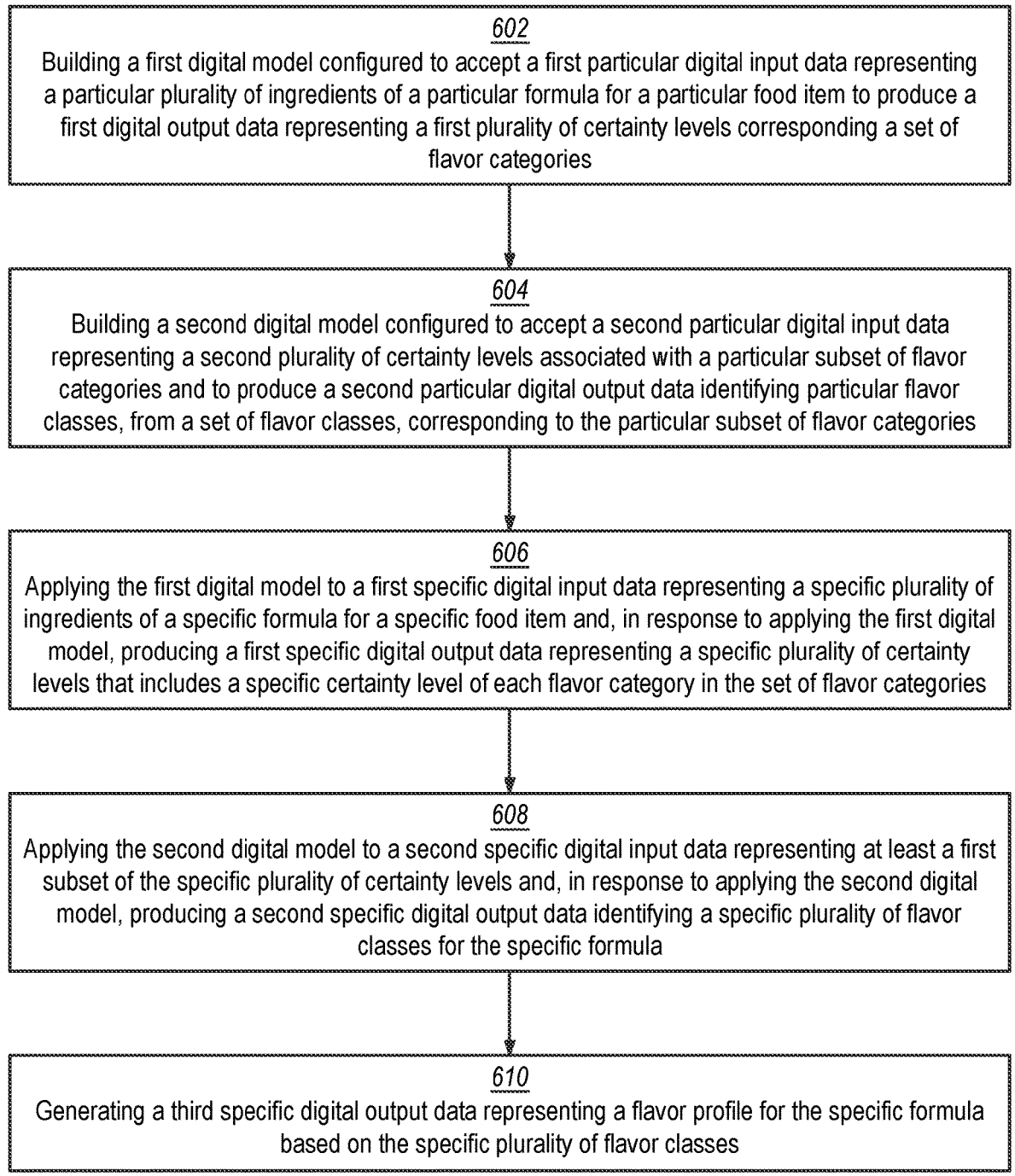
FIG. 6 illustrates an example method to perform a flavor classification of a formula for a recipe, in certain embodiments.

FIG. 6 illustrates an example method 600 to perform a flavor classification of a formula for a recipe, in certain embodiments. FIG. 6 may be used as a basis to code the method 600 as one or more computer programs or other software elements that a formula generator can execute or host.

At step 602, a first digital model is built. The first digital model is configured to accept a first particular digital input data representing a particular plurality of ingredients of a particular formula for a particular food item to produce a first particular digital output data representing a first plurality of certainty levels corresponding a set of flavor categories. The particular formula may be represented as a digitally stored vector comprising a feature dimension for each particular ingredient in the particular formula. In an embodiment, the first digital model may be a multi-label classification model that is trained to predict a level of certainty for each flavor category in the set of flavor categories. The first digital model may be built by training on a digital dataset comprising sets of ingredients and corresponding labels that specify one or more flavor granularities (e.g., flavor category, flavor class).

For example, the first digital model is the certainty level classifier 400 of FIG. 5. The input to the certainty level classifier 400 is a formula (e.g., set of ingredients) of a recipe, and the outputs of the certainty level classifier 400 include a plurality of certainty levels. The number of outputs generated by the certainty level classifier 400 may equate to the number of flavor categories in the inner most level of the flavor wheel 300 of FIG. 3.

At step 604, a second digital model is built. The second digital model is configured to accept a second particular digital input data representing a second plurality of certainty levels associated with a particular subset of flavor categories and to produce a second particular digital output data identifying particular flavor classes, from a set of flavor classes, corresponding to the particular subset of flavor categories. In an embodiment, the second digital model includes a plurality of classifier models. Each of the plurality of classifier models is trained to predict a flavor class, from the set of flavor classes, for a flavor category in the set of flavor categories. The set of flavor classes may be described in a digitally stored flavor wheel. An example flavor wheel is the flavor wheel 300 of FIG. 3. The second digital model may be built by training on the same digital training dataset used to train the first digital model.

For example, the plurality of classifier models is the flavor predictors 506a-506m of FIG. 5. The second digital model includes the flavor predictors 506a-506m. The inputs to the flavor predictors 506a-506m may include the certainty levels output from the certainty level classifier 400 that exceed respective thresholds corresponding with the flavor categories in the inner most level of the flavor wheel 300. The flavor predictors 506a-506m determine a deeper level of flavor classification by identifying flavor classes or flavor descriptors from the middle level of the flavor wheel 300. In an embodiment, a deeper level of flavor classification is only performed for those flavor classes that have certainty levels exceeding respective thresholds.

In an embodiment, an optional third digital model may be built. For example, the third digital model includes taste level classifiers. The third digital model is configured to produce, for the particular formula, a third particular digital output data identifying at least one taste level for at least one taste descriptor from a set of taste descriptors. A fourth particular digital output data representing a particular flavor profile may be generated for the particular formula based on the particular flavor classes and the at least one taste level.

At step 606, the first digital model is applied to a first specific digital input data representing a specific plurality of ingredients of a specific formula for a specific food item. In response to applying the first digital model, a first specific digital output representing a specific plurality of certainty levels that includes a specific certainty level of each flavor category in the set of flavor categories, is produced.

At step 608, the second digital model is applied to a second specific digital input data representing at least a first subset of the specific plurality of certainty levels. In response to applying the second digital model, a second specific digital output data identifying a specific plurality of flavor classes for the specific formula is produced. Each certainty level in the first subset of the specific plurality of certainty levels exceeds a threshold for a flavor category associated with a respective certainty level in the first subset.

In an embodiment, a tag request is generated and/or transmitted to a computing device, for each certainty level in a second subset of the specific plurality of certainty levels. Each certainty level in the second subset of the specific plurality of certainty levels does not exceed a threshold for a flavor category associated with a respective certainty level in the second subset.

At step 610, a third specific digital output data representing a flavor profile is generated for the specific formula based on the specific plurality of flavor classes. The flavor profile for the specific formula includes the specific plurality of flavor classes or descriptors identified by the second digital model.

In an embodiment, the method further includes using the flavor profile for the specific formula to prepare an alternative food item that mimics the specific food item.

Techniques described herein classify flavors for a given set of ingredients of a recipe from a set of possible classes of flavors. The techniques use deep learning models to allow different granularity levels corresponding to each flavor based on the desired precision within a classification of a particular flavor. Using these techniques, embodiments generate flavor profiles of food items that may be used when developing alternatives to the food items.

5.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
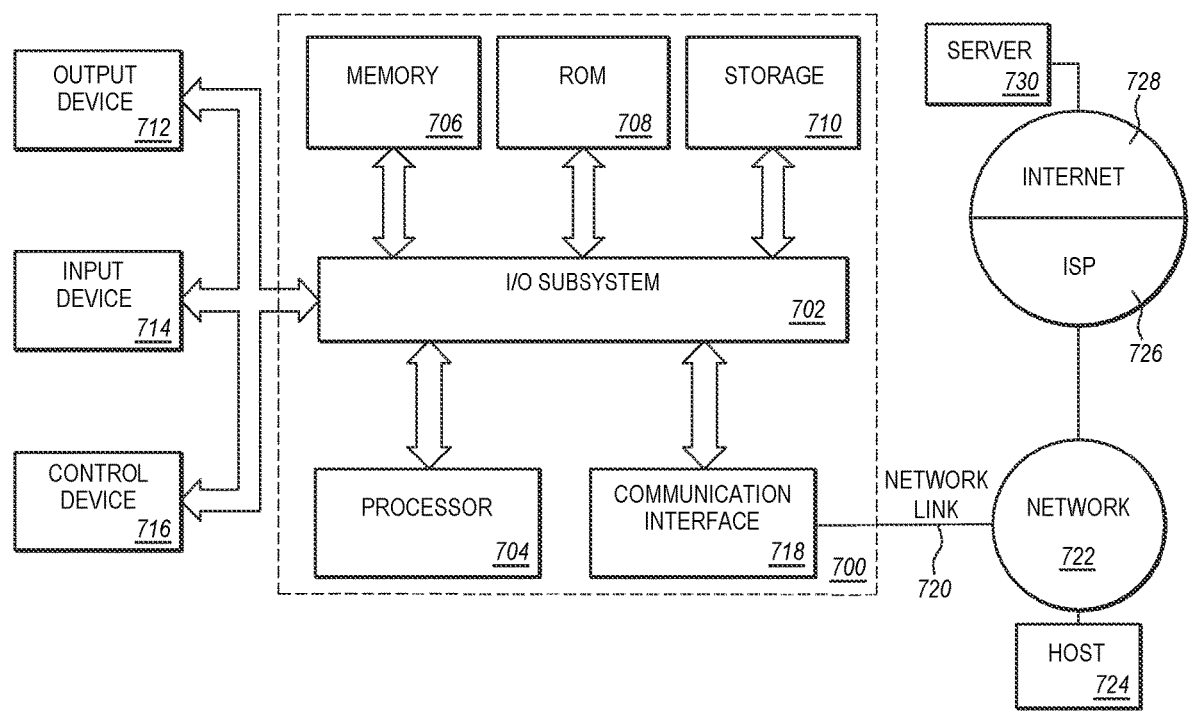
FIG. 7 illustrates a block diagram of a computing device in which the example embodiment(s) of the present invention may be embodiment.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk, or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators, or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork, or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0 Software Overview

Figure 8:
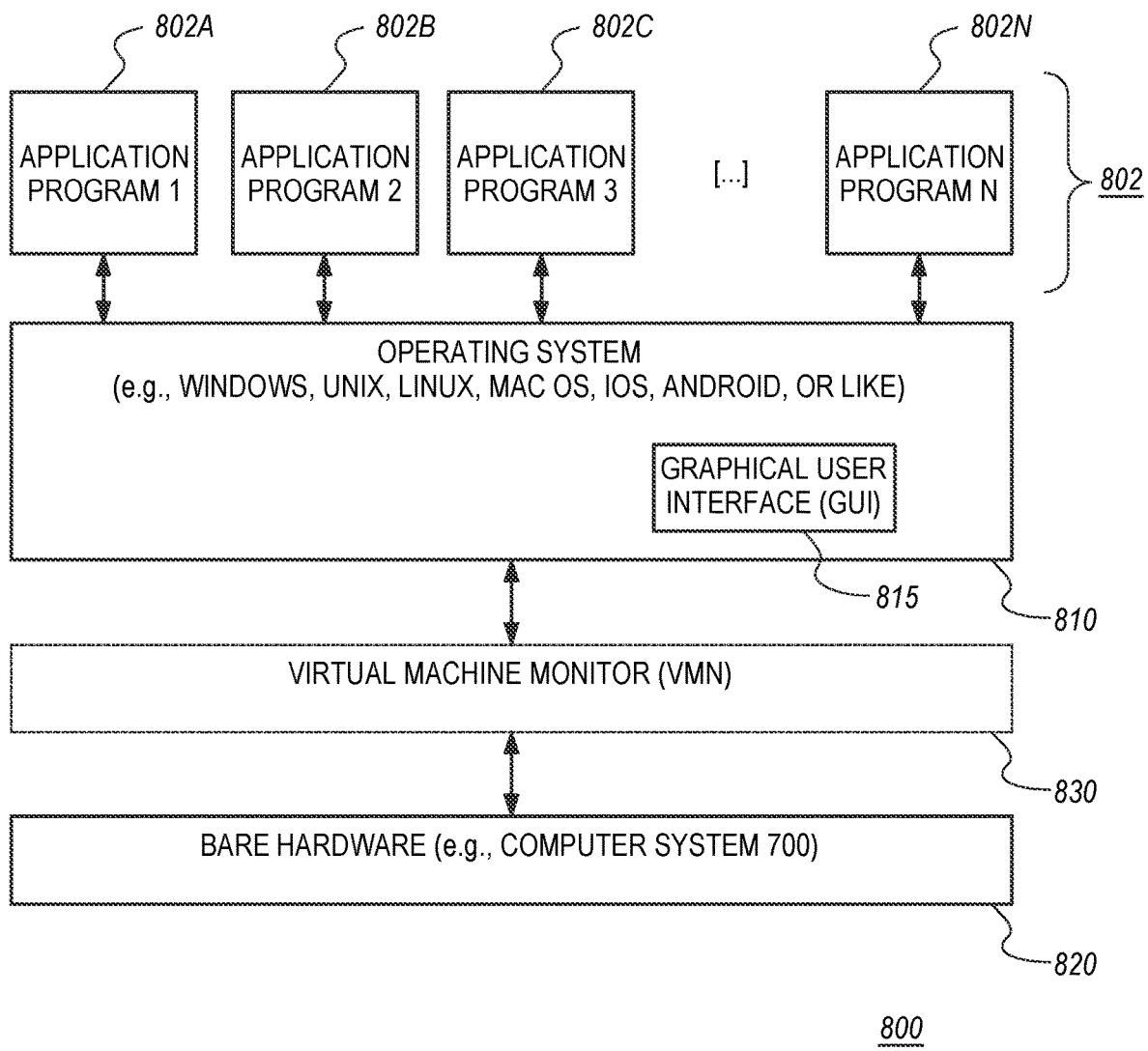
FIG. 8 illustrates a block diagram of a basic software system for controlling the operation of a computing device.

FIG. 8 is a block diagram of a basic software system 800 that may be employed for controlling the operation of computing device 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing device 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on device 800 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of device 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the device 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of device 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

7.0 Other Aspects of Disclosure

Note that the embodiments described herein relate to the flavors of the ingredients in the formula. However, it will be noted that the use of methods and systems described herein can be extended to classify texture, color, aftertaste and/or acceptance (e.g., for tasting a sample) for the formulas within the scope of the disclosed technologies.

In certain embodiments, flavor classifiers (e.g., for determining flavor categories), flavor predictors (e.g., for determining flavor descriptors), taste models (e.g., for determining taste levels), and/or other suitable models, suitable components of embodiments of the system 100, and/or suitable portions of embodiments of methods described herein can include, apply, employ, perform, use, be based on, and/or otherwise be associated with artificial intelligence approaches (e.g., machine learning approaches, etc.) including any one or more of: supervised learning (e.g., using gradient boosting trees, using logistic regression, using back propagation neural networks, using random forests, decision trees, etc.), unsupervised learning (e.g., using an Apriori algorithm, using K-means clustering), semi-supervised learning, a deep learning algorithm (e.g., neural networks, a restricted Boltzmann machine, a deep belief network method, a convolutional neural network method, a recurrent neural network method, stacked auto-encoder method, etc.), reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable artificial intelligence approach.

Models described herein can be run or updated: once; at a predetermined frequency; every time a certain process is performed; every time a trigger condition is satisfied and/or at any other suitable time and frequency. Models can be run or updated concurrently with one or more other models, serially, at varying frequencies, and/or at any other suitable time. Each model can be validated, verified, reinforced, calibrated, or otherwise updated based on newly received, up-to-date data; historical data or be updated based on any other suitable data.

Portions of embodiments of methods and/or systems described herein are preferably performed by a first party but can additionally or alternatively be performed by one or more third parties, users, and/or any suitable entities.

Additionally or alternatively, data described herein can be associated with any suitable temporal indicators (e.g., seconds, minutes, hours, days, weeks, time periods, time points, timestamps, etc.) including one or more: temporal indicators indicating when the data was collected, determined (e.g., output by a model described herein), transmitted, received, and/or otherwise processed; temporal indicators providing context to content described by the data; changes in temporal indicators (e.g., data over time; change in data; data patterns; data trends; data extrapolation and/or other prediction; etc.); and/or any other suitable indicators related to time.

Additionally or alternatively, parameters, metrics, inputs (e.g., formulas, ingredient attributes, other suitable features, etc.), outputs (e.g., flavor categories, flavor descriptors, other suitable flavor classes, taste levels, etc.), and/or other suitable data can be associated with value types including any one or more of: scores (e.g., certainty levels, taste level, etc.), text values (e.g., flavor descriptors, verbal descriptions of ingredients, etc.), numerical values, binary values, classifications, confidence levels, identifiers, values along a spectrum, and/or any other suitable types of values. Any suitable types of data described herein can be used as inputs (e.g., for different models described herein; for components of a system; etc.), generated as outputs (e.g., of models; of components of a system; etc.), and/or manipulated in any suitable manner for any suitable components.

Additionally or alternatively, suitable portions of embodiments of methods and/or systems described herein can include, apply, employ, perform, use, be based on, and/or otherwise be associated with one or more processing operations including any one or more of: extracting features, performing pattern recognition on data, fusing data from multiple sources, combination of values (e.g., averaging values, etc.), compression, conversion (e.g., digital-to-analog conversion, analog-to-digital conversion), performing statistical estimation on data (e.g. ordinary least squares regression, non-negative least squares regression, principal components analysis, ridge regression, etc.), normalization, updating, ranking, weighting, validating, filtering (e.g., for baseline correction, data cropping, etc.), noise reduction, smoothing, filling (e.g., gap filling), aligning, model fitting, binning, windowing, clipping, transformations, mathematical operations (e.g., derivatives, moving averages, summing, subtracting, multiplying, dividing, etc.), data association, interpolating, extrapolating, clustering, image processing techniques, other signal processing operations, other image processing operations, visualizing, and/or any other suitable processing operations.

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method performed by one or more computing devices, the method comprising:
training, using a training data set, a plurality of flavor prediction models to match first digital data representing recipes for food items to second digital data representing flavor granularities of the food items cooked according to the recipes, the training data set comprising the first digital data representing the recipes for the food items and the second digital data representing the flavor granularities of the food items cooked according to the recipes, each flavor prediction model of the plurality of flavor prediction models corresponding with a flavor category in a plurality of flavor categories;

storing a formula vector in computer memory, the formula vector representing a formula for a food item; and applying one or more flavor prediction models of the plurality flavor prediction models to the formula vector to generate a flavor profile for the formula for the food item.

2. The method of claim 1, wherein each flavor prediction model of the plurality of flavor prediction models is trained to predict at least one flavor class from a plurality of flavor classes corresponding with a flavor category.

3. The method of claim 1, wherein the flavor profile describes one or more flavor classes, wherein each class of the one or more flavor classes corresponds with a flavor category from the plurality of flavor categories.

4. The method of claim 3, wherein the flavor profile describes a flavor level for each of the one or more flavor classes.

5. The method of claim 1, wherein the formula vector includes a first component and a second component, wherein the first component corresponds to nutritional, chemical, and physiochemical attributes, wherein the second component corresponds to a plurality of ingredients present in the formula.

6. The method of claim 1, further comprising determining the one or more flavor prediction models to apply the formula, wherein the one or more flavor prediction models are determined based on predicted flavor category certainty levels for the formula.

7. The method of claim 1, further comprising using a trained classifier model to predict flavor category certainty levels for the formula.

8. One or more non-transitory computer-readable storage media storing one or more instructions programmed for performing a flavor classification of a formula for a recipe and which, when executed by one or more computing devices, cause:

training, using a training data set, a plurality of flavor prediction models to match first digital data representing recipes for food items to second digital data representing flavor granularities of the food items cooked according to the recipes, the training data set comprising the first digital data representing the recipes for the food items and the second digital data representing the flavor granularities of the food items cooked according to the recipes, each flavor prediction model of the plurality of flavor prediction models corresponding with a flavor category in a plurality of flavor categories;

storing a formula vector in computer memory, the formula vector representing a formula for a food item; and applying one or more flavor prediction models of the plurality flavor prediction models to the formula vector to generate a flavor profile for the formula for the food item.

9. The one or more non-transitory computer-readable storage media of claim 8, wherein each flavor prediction model of the plurality of flavor prediction models is trained to predict at least one flavor class from a plurality of flavor classes corresponding with a flavor category.

10. The one or more non-transitory computer-readable storage media of claim 8, wherein the flavor profile describes one or more flavor classes, wherein each class of the one or more flavor classes corresponds with a flavor category from the plurality of flavor categories.

11. The one or more non-transitory computer-readable storage media of claim 10, wherein the flavor profile describes a flavor level for each of the one or more flavor classes.

12. The one or more non-transitory computer-readable storage media of claim 8, wherein the formula vector includes a first component and a second component, wherein the first component corresponds to nutritional, chemical, and physiochemical attributes, wherein the second component corresponds to a plurality of ingredients present in the formula.

13. The one or more non-transitory computer-readable storage media of claim 8, wherein the one or more instructions, when executed by the one or more computing devices, further cause determining the one or more flavor prediction models to apply the formula, wherein the one or more flavor prediction models are determined based on predicted flavor category certainty levels for the formula.

14. The one or more non-transitory computer-readable storage media of claim 8, wherein the one or more instructions, when executed by the one or more computing devices, further cause using a trained classifier model to predict flavor category certainty levels for the formula.

15. A computing system comprising:

one or more computer systems comprising one or more hardware processors and storage media; and instructions stored in the storage media and which, when executed by the computing system, cause the computing system to perform:

storing a formula vector in computer memory, the formula vector representing a formula for a food item; and applying one or more flavor prediction models of a plurality flavor prediction models to the formula vector to generate a flavor profile for the formula for the food item;

wherein the plurality of flavor prediction models is trained by:

training, using a training data set, the plurality of flavor prediction models to match first digital data representing recipes for food items to second digital data representing flavor granularities of the food items cooked according to the recipes, the training data set comprising the first digital data representing the recipes for the food items and the second digital data representing the flavor granularities of the food items cooked according to the recipes, each flavor prediction model of the plurality of flavor prediction models corresponding with a flavor category in a plurality of flavor categories.

16. The computing system of claim 15, wherein each flavor prediction model of the plurality of flavor prediction models is trained to predict at least one flavor class from a plurality of flavor classes corresponding with a flavor category.

17. The computing system of claim 15, wherein the flavor profile describes one or more flavor classes, wherein each class of the one or more flavor classes corresponds with a flavor category from the plurality of flavor categories.

18. The computing system of claim 17, wherein the flavor profile describes a flavor level for each of the one or more flavor classes.

19. The computing system of claim 15, wherein the formula vector includes a first component and a second component, wherein the first component corresponds to nutritional, chemical, and physiochemical attributes, wherein the second component corresponds to a plurality of ingredients present in the formula.

20. The computing system of claim 15, wherein the one or more instructions, when executed by the one or more computing devices, further cause determining the one or more flavor prediction models to apply the formula, wherein the one or more flavor prediction models are determined based on predicted flavor category certainty levels for the formula.

* * * * *